(12) United States Patent
Kelm et al.

(10) Patent No.: US 12,003,536 B2
(45) Date of Patent: Jun. 4, 2024

(54) METHOD FOR THE AUTOMATED CREATION OF A PHISHING DOCUMENT ADDRESSED TO A PREDEFINED PERSON

(71) Applicant: IT-Seal GmbH, Darmstadt (DE)

(72) Inventors: David Kelm, Darmstadt (DE); Christian Klos, Darmstadt (DE)

(73) Assignee: IT-Seal GmbH, Darmstadt (DE)

( * ) Notice: Subject to any disclaimer, the term of this patent is extended or adjusted under 35 U.S.C. 154(b) by 386 days.

(21) Appl. No.: 17/310,105

(22) PCT Filed: Dec. 16, 2019

(86) PCT No.: PCT/EP2019/085270
§ 371 (c)(1),
(2) Date: Jul. 16, 2021

(87) PCT Pub. No.: WO2020/148046
PCT Pub. Date: Jul. 23, 2020

(65) Prior Publication Data
US 2022/0116419 A1  Apr. 14, 2022

(30) Foreign Application Priority Data
Jan. 17, 2019  (LU) .......... 101105

(51) Int. Cl.
*H04L 9/40* (2022.01)
(52) U.S. Cl.
CPC .............. *H04L 63/1483* (2013.01)
(58) Field of Classification Search
CPC .......... H04L 63/1483; G06Q 10/107
See application file for complete search history.

(56) References Cited

U.S. PATENT DOCUMENTS

| 6,718,368 B1 | 4/2004 | Ayyadurai |
| 9,342,507 B1 | 5/2016 | Kaeser |

(Continued)

FOREIGN PATENT DOCUMENTS

| DE | 19626142 A1 | 1/1998 |
| DE | 10259206 A1 | 7/2004 |
| WO | 2018194906 A1 | 10/2018 |

OTHER PUBLICATIONS

Wolbert, Christian, „Den Unterschied merkt man nicht, c't, Heft, Mar. 2017, pp. 70/71, Heise Medien.

(Continued)

*Primary Examiner* — Henry Tsang
(74) *Attorney, Agent, or Firm* — Smartpat PLC

(57) ABSTRACT

An automated creation of a phishing document uses personal data of a person stored in a database of persons and anonymous and categorisable personal properties stored in a hierarchical properties database. A relevance value is assigned to each personal property. At least one property of the person contained in the personal data has a correspondence in the properties database, that is a correspondence property. It is verified whether one of the correspondence properties is hierarchically subordinate to a phishing-document-specific default personal property. This subordinate correspondence property forms a creation property. The phishing document is created based on the creation property if this requirement is met. It is verified whether the relevance value of the creation property corresponds to a predefined target relevance value. The creation property is selected as a preparation property and used to prepare the phishing document if the assigned relevance value corresponds to the target relevance value.

6 Claims, 1 Drawing Sheet

(56) References Cited

U.S. PATENT DOCUMENTS

| | | | |
|---|---|---|---|
| 9,582,501 | B1 | 2/2017 | Salmon et al. |
| 9,749,360 | B1 | 8/2017 | Irimie et al. |
| 2007/0079248 | A1 | 4/2007 | Finke et al. |
| 2013/0198846 | A1 | 8/2013 | Chapman |
| 2014/0089084 | A1 | 3/2014 | Benyamin et al. |
| 2015/0288717 | A1* | 10/2015 | Bringsjord .......... H04L 63/1483 726/22 |
| 2016/0036829 | A1* | 2/2016 | Sadeh-Koniecpol ....................... G06F 21/567 726/23 |
| 2016/0308897 | A1* | 10/2016 | Chapman .............. G06F 40/186 |
| 2017/0126729 | A1* | 5/2017 | Oberheide .......... H04L 63/1483 |
| 2018/0307844 | A1 | 10/2018 | Kras et al. |
| 2019/0014148 | A1 | 1/2019 | Foster et al. |
| 2019/0121841 | A1 | 4/2019 | Sbodio et al. |

OTHER PUBLICATIONS

Ariu, Davide, Enrico Frumento, and Giorgio Fumera. "Social engineering 2.0: A foundational work." In Proceedings of the Computing Frontiers Conference, pp. 319-325. 2017.

Ball, Leslie, Gavin Ewan, and Natalie Coull. "Undermining: social engineering using open source intelligence gathering." In 4th International Conference on Knowledge Discovery and Information Retrieval, pp. 275-280. Scitepress Digital Library, 2012.

CPNI Centre for the Protection of National Infrastructure; Online Reconnaissance: „How Your Internet Profile Can Be Used Against You; May 2013, S. 1-5 https://nsarchive.gwu.edu/document/16966-united-kingdom-government-online-reconnaissance.

CPNI Centre for the Protection of National Infrastructure; Spear Phishing: Understanding the Threat, Sep. 2013, p. 1-7, https://nsarchive.gwu.edu/document/17165-united-kingdomgovernment-online-reconnaissance.

Das, Avisha, and Rakesh Verma. "Automated email generation for targeted attacks using natural language." arXiv.org,,Aug. 19, 2019, Cornell University Library, 201 Olin Library Cornell University Ithaca, NY 14853.

Edwin Schicker: "Datenbanken und SQL—Eine praxisorientierte Einführung mit Anwendungen in Oracle, SQL Server und MySQL", 5. aktualisierte und erweiterte Auflage, 2017, insbesondere S. 14, ISBN 978-3-658-16128-6.

Frank Hermann, Datenorganisation und Datenbanken, Springer Fachmedien Wiesbaden GmbH, 2018, ISBN 978-3-658-21330-5, pp. 72-74.

Panning for gold: Automatically analysing online social engineering attack surfaces, Authors: Edwards Matthew, Larson Robert, Green Benjamin, Rashid Awais, Baron Alistair, Publication data: Computers & Security, Dec. 29, 2016, Elsevier Science Publishers. Amsterdam, NL, vol. 69, pp. 18-34.

Phishing Automation: Automat Your Phishing Defense While Keeping Human Control, Sep. 6, 2018, 3 pages, https://cofense.com/automate-phishing-defense-keeping-human-control/.

Ulrich Neymeyr, Opposition against European Patent 3 744 068.

Wikipedia Page "Document automation".

* cited by examiner

METHOD FOR THE AUTOMATED CREATION OF A PHISHING DOCUMENT ADDRESSED TO A PREDEFINED PERSON

CROSS-REFERENCE TO RELATED APPLICATION

This application is a national stage application, filed under 35 U.S.C. § 371, of International Patent Application No. PCT/EP2019/085270, filed on Dec. 16, 2019, which claims the benefit of Luxembourg Patent Application No. 101105, filed Jan. 17, 2019.

TECHNICAL FIELD

The present application relates to a method for the automated creation of a phishing document.

BACKGROUND

Phishing documents are used in so-called phishing attacks, in which phishing documents are sent to a plurality of persons to obtain personal data and information of the person affected by the respective phishing attack or in particular of the company at which the person is employed. To this end, it is attempted by means of fake websites, e-mails, text messages or even telephone calls to prompt the person to a specific reaction or also to directly surrender information. It is thus known, for example, to use phishing e-mails to prompt the e-mail recipient to click on a file attached to the e-mail or a hyperlink contained in the e-mail text, malware then being installed unnoticed on the computer of the person affected by the phishing attack. This malware can then be used by the person carrying out the phishing attack to obtain further information about the person attacked or the company, such as bank data, for example. Such phishing e-mails, fake websites and text messages (SMS) are phishing documents in the sense of the disclosure.

Phishing attacks are generally based on the concept of deceiving the person attacked into thinking that the e-mail originator, the website provider or the originator of the SMS is a trustworthy person or institution. In phishing attacks, therefore, websites of known banks are imitated, for example, in order in this way to prompt the person affected by the phishing attack to enter personal and confidential bank data on the falsified website provided.

The success of a phishing attack depends in particular on how trustworthy the person attacked deems the respective phishing attack to be. This is a matter on the one hand of how attentive the affected person is and of their knowledge of possible phishing attacks, and on the other hand of the quality of the particular phishing attack.

To train and increase attentiveness, it is known for companies to offer their employees suitable training in which the dangers of such phishing attacks are explained to the employees. Furthermore, it is known for companies to train their employees also through simulated phishing attacks.

To simulate the phishing attacks, it is necessary to create suitable and personalised phishing documents. For this it is first necessary to draft a letter text that is normally kept as general as possible and the content of which is prepared such that it can be sent to a large number of persons. Following the creation of the letter text in a first step, the personalisation of this letter text consists in determining a recipient address of the person to whom the phishing document is to be sent.

To create high-quality phishing documents, it is also known from the prior art to personalise the prepared letter texts further and use additional personal information of the person to whom the particular phishing document is to be addressed. It is thus known, for example, to deceive the person attacked by the phishing attack through the phishing document used into thinking that the originator of the phishing document is a colleague from another department of the same company, for example. Furthermore, other information such as hobbies and interests of the person attacked, for example, can be used in the phishing documents.

The information required for such extensive personalisation is normally compiled from the information generally accessible on social networks. The creation of especially largely personalised phishing documents, in particular also using and taking account of the interests and hobbies of the persons attacked, currently requires laborious personal research carried out manually as well as subsequent manual adaptation of the previously prepared letter texts.

SUMMARY

It is regarded as an object of the disclosure to reduce the outlay on creating in particular elaborately personalised phishing documents and to automate this where possible.

This object is achieved by a method for the automated creation of a phishing document addressed to a predefined person, wherein personal data of the person is stored in a database of persons, wherein anonymous and categorisable personal properties of any number of persons are stored in a hierarchically organised properties database, wherein a relevance value is assigned to each personal property, wherein at least one property of the person contained in the personal data has a correspondence in the properties database, wherein this correspondence forms a correspondence property in each case, wherein in a verification step, it is verified by an automated comparison of the correspondence properties and the personal properties stored in the properties database whether one of the correspondence properties is hierarchically subordinate to a phishing-document-specific default personal property, wherein this subordinate correspondence property forms a creation property, wherein the phishing document is created in a subsequent creation step based on the creation property if this requirement is met, wherein it is verified in the creation step whether the relevance value of the creation property corresponds to a predefined target relevance value, wherein the creation property is selected as a preparation property and used to prepare the phishing document if the assigned relevance value corresponds to the target relevance value, wherein a personal property arranged hierarchically above the creation property and with a relevance value corresponding to the target relevance value is selected as a preparation property and used to prepare the phishing document if the relevance value assigned to the creation property does not correspond to the target relevance value and wherein following the determination of the preparation property, the phishing document is created on the basis of a predefined template document using the preparation property.

The basis of the method is the personal data of the person that was previously determined manually or automatically and is stored in a temporary database. This personal data can originate in particular from information provided and published by the attacked person on social networks. Methods are known from the prior art for retrieving this personal information automatically and storing it in the database of persons.

As well as the name and contact data of the person, the personal data filed in the database of persons advantageously comprises in particular also details of interests and hobbies as well as details of personal contacts of the person. The personal data provided by persons on social networks and stored if necessary automatically in the database of persons cannot normally be taken over readily in prepared letter texts and processed further. It is possible, for example, that the person specifies their hobbies and interests in a manner that cannot readily be inserted into the letter texts, which are formulated as universally as possible.

For example, the person could have indicated as a hobby that the person plays football in football club XY. It can also be concluded directly from this information that the person is interested in football in general and moreover also in sport. A letter text or template document kept as general as possible and usable for many phishing attacks could generally be concerned with the subject of sport, for example, and then the specification of the type of sport in which the person attacked is interested could be provided in the letter text. In the case of a letter text of this kind, the information that the person plays football for club XY is not directly suitable to be used in the letter text. On the contrary, it is necessary to establish that from the interest "footballer with football club XY", the interest "football" and the more general interest "sport" can be deduced.

For this purpose the properties database is provided, which is independent of the personal data and the database of persons and in which categorisable personal properties are filed anonymised and ordered hierarchically. The hierarchical ordering of the properties database advantageously follows a tree structure.

In an upper hierarchical level, the properties database can contain generally formulated interest categories, for example, which can be applied to a plurality of persons. This general interest category could be called "Leisure interests", "Club interests" and "Vocational interests", for example. The rather more specific information "Sport", "Cars" and "Electronics", for example, could be contained in a hierarchical level subordinate to the leisure interests. In a hierarchical level downstream of the "Sport" category, the various types of sport could be further specified and in a hierarchical level following this, different football clubs could be created under a category "Football", for example.

These football clubs could equally be located hierarchically also under the top category "Club interests". This means that a specific interest can by all means be provided multiple times in the properties database if this specific interest can be assigned to several hierarchically superior, more general interests. It is also possible and provided that the specific interest is contained only once in the properties database, but is connected to several hierarchically superior interests.

With the aid of a properties database constructed in such a way, a general letter text can now be individualised for a predefined person. It is first verified automatically for this purpose in the verification step whether interests of the person filed in the properties database, the correspondence properties, are hierarchically subordinate to a phishing-document-specific default property. If the person is to be sent a phishing document, for example, the letter text of which is addressed to persons interested in sport, it is first necessary to establish in the verification step whether this letter text is suitable for the person, thus whether the person is interested in sport.

Since largely personalised phishing documents should be able to be created using the method, it is additionally also necessary during this checking that the correspondence properties known of the person and stored in the database of persons are hierarchically subordinate to the default personal property, in order to ensure if possible that other, more special interests of the person are known that can be used for personalisation of the template document. In the example it could relate in this case to the correspondence property "football club XY", which is hierarchically subordinate to the personal property football, which is in turn hierarchically subordinate to the default personal property "sport".

To select personal properties suitable for personalisation of the template document from the properties database, relevance values are assigned to the various personal properties filed in the properties database. It can then be provided in the template document or for the creation of the template document, for example, that at a certain point of the document a personal property hierarchically subordinate to the default personal property with a predefined target relevance value is to be used. This personal property is selected in the creation step as a preparation property, wherein the preparation property is the creation property or a personal property hierarchically superior to the creation property.

In the example, it could be provided in the letter text that the type of sport in which the person attacked is interested must be specified. A relevance value of 50, for example, could be assigned to the types of sport and it could be prescribed accordingly for the individualisation of the letter text that the personal property with the target relevance value of 50 is to be entered at the point provided in the letter text. The personal property "football club XY" could be assigned a relevance value of 10, for example. The correspondence property "football club XY" therefore has a lower relevance value than the target relevance value required for the creation of the letter text. It is verified thereupon whether a hierarchically superior personal property entry is present in the properties database that has the required relevance value. In the example, this is the information "football", which is then selected as preparation property and inserted into the letter text at the point provided in the template document.

The method can be carried out fully automatically if the database of persons, the properties database and the template document are present. The database of persons can likewise be created entirely automatically using means known from the prior art. The creation of the template document requires manual adaptations, at least currently. The creation of the properties database also currently still requires manual interventions in order to insert interests filed in the database of persons that are hitherto uncategorised into the properties database, to file them there and to assign relevance values to these personal properties. It is conceivable, however, to automate the creation of the properties database also, as the categorisation and assignment of relevance values can take place in a rules-based manner.

Further personalisation of the phishing document can be achieved in that personal properties that are to be assigned to different branches of the hierarchically organised properties database are provided in the template document or the letter text and are to be used. It is provided for this purpose that several default personal properties are predefined and that for each default personal property a creation property is determined, and that preparation properties, which are used in the template document, are determined for all creation properties.

Further personalisation is also possible in that for at least one creation property, at least two preparation properties are specified, wherein relevance values of the at least two preparation properties differ. In the example, a section of the letter text could say, for example: "You're interested in [type of sport] and are a member of [sports club]." The terms in square brackets in the sample text are two default properties, which have different relevance values and are assigned to the same branching in the hierarchically structured properties database. Particularly elaborately formulated and particularly personalised phishing documents can be prepared in this way.

In a particularly advantageous configuration of the method, it is provided that for at least one creation property, at least two preparation properties are specified, wherein hierarchical levels of the at least two preparation properties differ. It is advantageously provided that relevance values of personal properties of hierarchically superior categories are greater than relevance values of lower-categorised personal properties. It is also possible and provided, however, that the relevance values do not follow the hierarchy, in order in this way to achieve further structuring of the properties database with personal properties that are not normally to be used in letter texts. In order to be able to determine at least two hierarchically superior personal properties for one creation property in this case, it is provided as a further distinguishing criterion that the at least two preparation properties should be assigned to different hierarchical levels.

It is entirely possible and also provided that a number of hierarchically subordinate correspondence properties can be assigned to a default personal property. It is also provided for this reason that all correspondence properties are determined in the verification step, in order to be able to then make a selection of the suitable creation property on the basis of these correspondence properties. The selection rule used for this can assess and select the various creation properties in various ways. For example, selection could take place randomly.

The relevance values can be numerical values. They can also be qualitative indications, however, such as "important", "unimportant", "suitable" or similar, for example. The relevance values can also be relevance value ranges. It is also possible and provided that the target relevance values are target relevance value ranges. It can thus be provided in the template document, for example, that at a predefined point a personal property is to be identified from the properties database and used as a preparation property, which has a relevance value of between 40 and 60.

To create the properties database, it is provided that in a personal data acquisition step preceding the verification step, personal data of the person is automatically identified from at least one predefined, publicly accessible database, wherein in a personal data assignment step, the personal data identified is categorised according to a set of rules for each public database used and is temporarily stored to the database of persons, wherein it is verified automatically in a comparison step whether anonymisable personal data stored in the database of persons in the personal data assignment step is filed in the properties database, and wherein for anonymisable personal data not filed in the properties database, a new personal property data record is inserted respectively into the properties database, wherein each personal property data record has at least a personal property description and a hierarchical position of the personal property data record in relation to at least one other personal property data record.

The personal data acquisition step can be carried out automatically by automated queries of the publicly accessible databases and in particular of social networks. The personal data assignment step can likewise take place automatically.

In the personal data assignment step, the automatically determined personal data is transferred to the database of persons according to the respective set of database rules. The sets of database rules here describe the database structure used by each public database. For example, personal interests are termed "hobbies" in a first database and "interests" in a second database. To be able to transfer such different database structures to a common database of persons, pertinent sets of database rules are provided and predefined.

Following the automatic creation of the database of persons, it is likewise verified automatically whether one or more of the determined and anonymisable personal properties are filed in the properties database. In this case the respective personal property filed in the database of persons is advantageously allocated a data record ID assigned to the corresponding entry in the properties database, in order to facilitate simple execution of the verification step and the subsequent steps later.

To further develop the properties database continuously and to prepare and improve it for future phishing attacks and for the preparation of further phishing documents, personal properties not already filed in the properties database are added to the properties database. In this case the respective personal property is categorised and a relevance value is advantageously assigned to the personal property.

The personal property data record belonging to a personal property in the properties database advantageously comprises the personal property description and the hierarchical position of the personal property data record in relation to at least one other personal property data record. Furthermore, the personal property data record advantageously contains the reference value. It is also possible and provided that the personal property data record contains other information such as alternative descriptions or similar, for example.

Other advantageous configurations of the method are explained in greater detail with reference to an exemplary embodiment depicted in the drawings.

DETAILED DESCRIPTION

Figure 1:
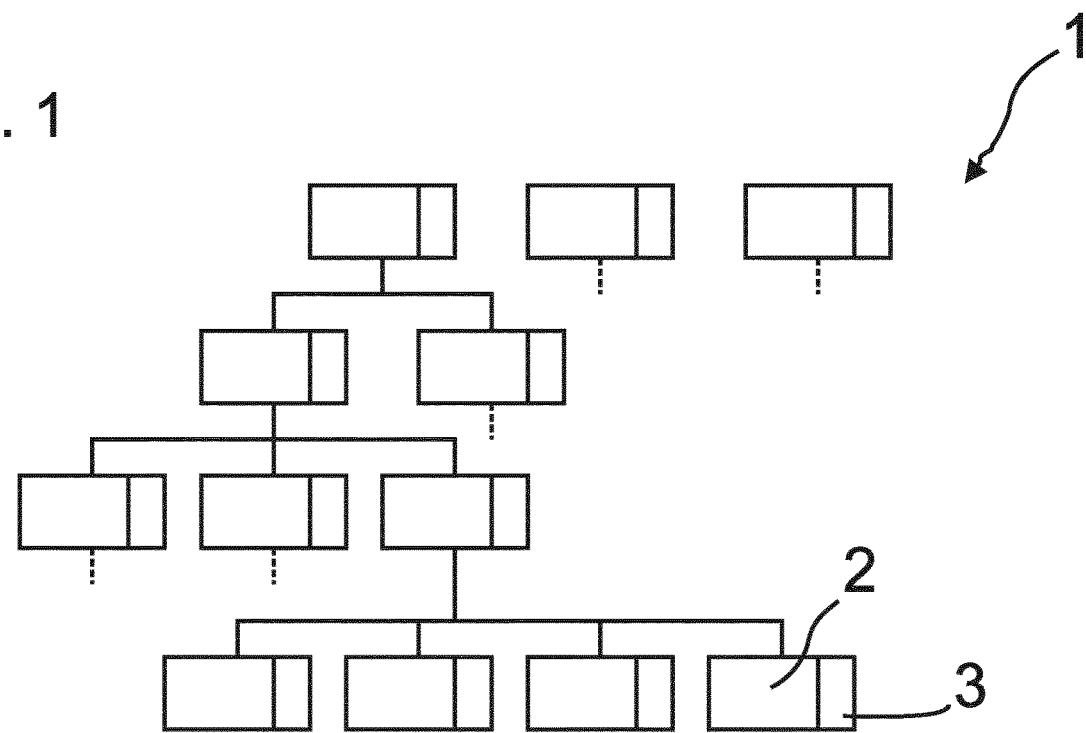
FIG. 1 is a schematic depiction of a properties database.

In FIG. 1, a structure of a hierarchically organised properties database 1 is depicted schematically. Filed in the properties database 1 are anonymous and categorisable personal properties 2 of any number of persons, wherein a relevance value 3 is assigned to each personal property 2. The dashed connection lines shown identify further hierarchical dependencies of other personal properties not shown. In the depiction, a personal property 2 and a relevance value 3 is identified by way of example by a reference character.

Figure 2:
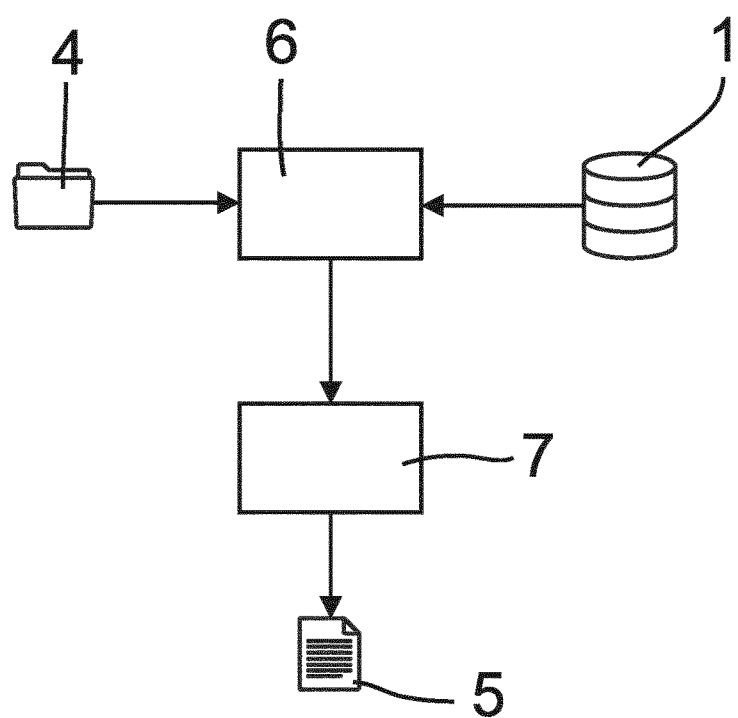
FIG. 2 is a schematically depicted sequence of the method.

This properties database 1 is used together with a database of persons 4 for the automated execution of the method depicted schematically in FIG. 2 for the creation of a phishing document 5. It is first verified in a verification step 6 by an automated comparison of the correspondence properties for a specific person filed in the database of persons 4 and the personal properties 2 stored in the properties database 1 whether one of the correspondence properties is hierarchically subordinate to a phishing-document-specific default personal property. This subordinate correspondence property then forms a creation property. The phishing document 5 is created in a subsequent creation step 7 based on the creation property if this requirement is met. It is verified in the creation step 7 whether the relevance value 3 of the creation property corresponds to a predefined target relevance value. If this is the case, the creation property is selected as a preparation property and used to prepare the phishing document 5. Otherwise, a personal property 2 arranged hierarchically above the creation property and with a reference value 3 that corresponds to the target reference value is selected as preparation property and used to prepare the phishing document 5. Following the determination of the preparation property, the phishing document 5 is created on the basis of a predefined template document using the preparation property.

The invention claimed is:

1. A method for an automated creation of a phishing document addressed to a person, comprising:
   storing personal data of the person in a database of persons;
   storing anonymous and categorisable personal properties of any number of persons in a hierarchically organised properties database;
   assigning a relevance value to each of the personal properties,
      wherein at least one property of the person contained in the personal data has a correspondence in the properties database, and
      wherein the correspondence forms a correspondence property;
   verifying, in a verification step, by an automated comparison of the correspondence property and the personal properties stored in the properties database whether the correspondence property is hierarchically subordinate to a phishing-document-specific default personal property,
      wherein the correspondence property forms a creation property if the correspondence property is subordinate to the phishing-document-specific default personal property,
         whereby the relevance value of the at least one property of the person contained in the personal data is associated with the correspondence property;
   creating the phishing document in a subsequent creation step based on the creation property if the correspondence property is subordinate to the phishing-document-specific default personal property;
   verifying in the creation step whether the relevance value associated with the creation property corresponds to a predefined target relevance value;
   selecting the creation property as a preparation property and using the creation property to prepare the phishing document if the relevance value associated with the creation property corresponds to the predefined target relevance value;
   selecting a personal property that is arranged hierarchically above the creation property and has a relevance value corresponding to the target relevance value as the preparation property and using the preparation property to prepare the phishing document if the relevance value associated with the creation property does not correspond to the target relevance value; and after selecting the preparation property,
   creating the phishing document based on a predefined template document using the preparation property.

2. The method according to claim 1, further comprising:
   predefining several default personal properties;
   determining a creation property for each default personal property; and
   determining preparation properties, which are used in the template document, for all creation properties.

3. The method according to claim 1, further comprising:
   determining at least two preparation properties for at least one creation property,
   wherein relevance values of the at least two preparation properties differ.

4. The method according to claim 1, further comprising:
   determining at least two preparation properties are determined for at least one creation property,
   wherein hierarchical levels of the at least two preparation properties differ.

5. The method according to claim 1, further comprising
   first determining, in the verification step, all correspondence properties hierarchically subordinate to the default personal property and
   then selecting one of the correspondence properties as the creation property according to a predefined selection rule.

6. The method according to claim 1, further comprising:
   automatically identifying, in a personal data acquisition step preceding the verification step, personal data of the person identified from at least one predefined, publicly accessible database,
   categorizing, in a personal data assignment step, the personal data identified according to a set of database rules predefined for each public database used and temporarily storing the personal data in the database of persons;
   automatically verifying, in a comparison step, whether anonymisable personal data stored in the database of persons in the personal data assignment step is filed in a properties database,
   inserting a new personal property data record into the properties database for anonymisable personal data not filed in the properties database,
   wherein each personal property data record has at least a personal property description and a hierarchical position of the personal property data record in relation to at least one other personal property data record.

* * * * *